United States Patent
Nagata et al.

(10) Patent No.: US 7,246,262 B2
(45) Date of Patent: Jul. 17, 2007

(54) STORAGE SUBSYSTEM AND INFORMATION PROCESSING SYSTEM

(75) Inventors: Koji Nagata, Odawara (JP); Kenichi Takamoto, Odawara (JP)

(73) Assignee: Hitachi, Ltd. (JP)

(*) Notice: Subject to any disclaimer, the term of this patent is extended or adjusted under 35 U.S.C. 154(b) by 185 days.

(21) Appl. No.: 10/911,125

(22) Filed: Aug. 3, 2004

(65) Prior Publication Data

US 2005/0022050 A1    Jan. 27, 2005

Related U.S. Application Data

(63) Continuation of application No. 09/758,684, filed on Jan. 10, 2001, now Pat. No. 6,795,934.

(30) Foreign Application Priority Data

Feb. 10, 2000  (JP) ............................. 2000-032873

(51) Int. Cl.
*G06F 11/00* (2006.01)
(52) U.S. Cl. .................. 714/8; 714/5; 714/6; 714/7; 714/42; 714/43; 709/251
(58) Field of Classification Search .............. 714/5, 714/7, 6, 8, 42, 43, 717; 709/251
See application file for complete search history.

(56) References Cited

U.S. PATENT DOCUMENTS 5,768,551 A * 6/1998 Bleiweiss et al. .......... 710/316
6,032,271 A * 2/2000 Goodrum et al. ............ 714/56
6,260,079 B1 * 7/2001 White ........................ 710/8
6,430,714 B1 * 8/2002 McAdam et al. .......... 714/704
6,571,355 B1 * 5/2003 Linnell ...................... 714/4
6,678,839 B2 * 1/2004 Mori .......................... 714/44

FOREIGN PATENT DOCUMENTS

JP    2001-216206 A    8/2001

OTHER PUBLICATIONS

Japan Patent Office (JPO) office action dated Jan. 16, 2007 for JPO application JP2000-032873.

* cited by examiner

*Primary Examiner*—Robert Beausoliel
*Assistant Examiner*—Joseph D Manoskey
(74) *Attorney, Agent, or Firm*—Townsend and Townsend and Crew LLP (57) ABSTRACT

According to the invention, techniques for detecting and recovering from errors occurring in disk drive subsystems having a controller and drive units connected by a fibre channel loop. Specific embodiments can provide storage subsystems, methods and apparatus for use in information processing environments, for example. Embodiments can determine when each drive is disconnected from the loop in the external storage subsystem structured by using the FC Loop, and thereupon, the FC Loop can be controlled by bridging the communication path using the PBC so that the loop is not broken.

18 Claims, 8 Drawing Sheets

FIG.1

161 : FC LOOP
171 : FC LOOP

STORAGE SUBSYSTEM AND INFORMATION PROCESSING SYSTEM

CROSS-REFERENCES TO RELATED APPLICATIONS

This application claims priority from Japanese Patent Application Reference No. P00-032873, filed Feb. 10, 2000.

BACKGROUND OF THE INVENTION

The present invention relates to techniques for use in a storage subsystem and an information processing system, and in particular to techniques for detecting and recovering from errors occurring in storage subsystems having two or more components linked together by a communication link with a loop topology such as the fibre channel loop.

Conventional high capacity storage subsystems can be comprised of two or more hard disk drives which are connected by a Fibre Channel (FC). In the connecting topology of the FC Loop (FIBRE CHANNEL ARBITRATED LOOP (FC-AL)), each drive and a controller which controls the drive in the storage subsystem are connected with one another by a loop topology. A port bypass circuit (PBC) is installed in a connecting part between each drive and the FC Loop in order to disconnect the drive from the FC Loop when the drive incurs a failure or is to be replaced by another drive.

The Fibre Channel, one of the super gigabit technologies, has been standardized under the name, "ANSI NCITS T11" (ANSI X3 T11 by former name).

While certain advantages are perceived, opportunities for further improvement exist. For example, according to conventional FC Loop technology, once the fibre channel loop is broken at any point, it becomes substantially impossible to communicate between a controller and each drive connected to the fibre channel loop.

What is needed are techniques for improving for detecting and recovering from errors occurring in disk drive subsystems having a controller and drive units connected by a fibre channel loop.

SUMMARY OF THE INVENTION

According to the invention, techniques for detecting and recovering from errors occurring in disk drive subsystems having a controller and drive units connected by a fibre channel loop are provided. Specific embodiments can provide storage subsystems, methods and apparatus for use in information processing environments, for example. Embodiments can determine when each drive is disconnected from the loop in the external storage subsystem structured by using the FC Loop, and thereupon, the FC Loop can be controlled by bridging the communication path using the PBC so that the loop is not broken.

An object of the present invention is to provide the storage subsystem equipped with the communicating means of loop topology, for preventing the decrease in the performance and/or reliability to the minimum, even if any failure occurs on the storage subsystem.

Another object of the present invention is to provide the storage subsystem equipped with the communicating means of loop topology, for determining the failing part and for recovering from the failure quickly, simply and precisely.

Another object of the present invention is to provide the storage subsystem equipped with multiple communicating means of loop topology, for recovering reliably from the multiple failure having influence upon the multiple loops of communicating means.

An object of the present invention is to provide the information processing system equipped with the communicating means of loop topology, for minimizing the decrease in the performance and/or reliability, even if any failure occurs in the information processing system.

Another object of the present invention is to provide the information processing system equipped with the communicating means of loop topology, for determining the failing part and for recovering from the failure in the processing system quickly, simply and precisely.

Another object of the present invention is to provide the information processing system equipped with multiple communicating means of loop topology, for recovering from multiple failure having influence upon the multiple loops communicating means.

In a representative embodiment according to the present invention, a storage subsystem is provided. The disk storage subsystem can include a plurality of storage drives, a plurality of controllers to control said storage drives, and a plurality of data communication loops to connect the storage drives and the controllers and to exchange information between the controllers and the storage drives, a first bypass mechanism that connects and disconnects at least one of each of the storage drives and each of the controllers individually to each of the communication loops, and a second bypass mechanism that bridges each of the communication loops at a specified location to selectively isolate a portion of the communication loop. Responsive to detecting a failure, at least one of the controllers commands at least one of the first and second bypass mechanisms to successively disconnect and re-connect each of the storage devices to each of the communication loops under control of the controller through the other of the communication loops, to locate a cause of the failure.

In another representative embodiment according to the present invention, an information processing system is provided. The information processing system can comprise a plurality of component units, each of which performs at least one of storing information and processing information, a data communication loop to connect the component units and to exchange information with each other within the component units, a first bypass mechanism to control the connection and disconnection of each of the component units individually to and from the communication loop, and a second bypass mechanism to bridge the communication loop at a specified location and to selectively isolate a part of the communication loop. Responsive to detecting a failure, at least one of the component units commands at least one of the first and second bypass mechanisms to successively disconnect and re-connect each of the component units to the data communication loop to locate a cause of the failure.

In a further representative embodiment according to the present invention, a storage subsystem is provided. The storage subsystem can comprise a plurality of storage devices, linked to a plurality of controllers to control the storage devices by a plurality of data communication loops. The communication loops connect the storage devices and the controllers to exchange information between the controllers and the storage devices. The storage subsystem can also comprise a first plurality of bypass switches. Each bypass switch operable to connect an associated one of the storage devices, and each of the controllers individually to each of the communication loops and to disconnect the associated one of the storage devices and the each of the controllers individually from each of the communication loops. A second plurality of bypass switches can also be part of the subsystem. Each switch can be operable to connect, in a first operating state, to a group of the plurality of storage devices and their respective associated bypass switches, for electrical signal communications with the one or more of the plurality of controllers. In a second operating state, the second plurality of bypass switches provides for electrically isolating the group of storage devices and their respective associated bypass switches from communicating with the at least one of a plurality of controllers, while maintaining other storage devices in the communication loop. Responsive to detecting a failure, at least one of the controllers commands at least one of the first and second plurality of bypass switches to disconnect and re-connect at least one of the storage devices to at least one of the communication loops under control of the controller through the other of the communication loops.

In a yet further representative embodiment according to the present invention, a method for detecting and recovering from errors occurring in disk drive subsystem is provided. The disk subsystem can have a plurality of controllers that control a plurality of storage devices, the controllers and storage devices interconnected by a plurality of communication loops, including a first communication loop and a second communication loop. The method can include monitoring the communication loops for a presence of a failure. If a failure is detected, the method can disconnect successive disk storage units connected by the communication loops beginning at a point farthest from one of the plurality of controllers and determining whether the failure has been recovered from. If the failure has been recovered from, the method can determine an identity of a component being a probable cause of the failure based upon an identity of a switch that lead to recovery. Finally, the method can also include indicating the identity of the component that suffered a failure.

In specific embodiments, a storage subsystem having multiple drives and controllers that are connected with a communication loop topology, such as FC_AL, are provided. In addition, PBCs (first bypass mechanism) can be used to disconnect the drives and controllers from the loop. Further PBCs (second bypass mechanism) can be installed to bridge and divide the loop at any desired location within the loop.

By controlling these PBCs, the location of failing part in the loop can be determined. In specific embodiments, the location of the failing part can be determined by repeating operation to confirm the availability of the communication for the effective portion of the loop varying effective portion of the loop by controlling the PBC. If any operable portion of the loop is detected, the detected operable portion within the loop continues to be used, and only the inoperable portion of the loop is switched to the another loop; thereby, the decrease in the performance can be prevented to the minimum.

In additional specific embodiments, instructions for controlling the PBC are not issued through the communicating loop. Rather, a dedicated bus for controlling the PBC is provided. Therefore, any failing part can be isolated even if both of the duplicated loops are failing simultaneously. Communication is still available using the remaining operable portion of the loop.

Numerous benefits are achieved by way of the present invention over conventional techniques. These and other benefits are described throughout the present specification. A further understanding of the nature and advantages of the invention herein may be realized by reference to the remaining portions of the specification and the attached drawings.

DESCRIPTION OF THE SPECIFIC EMBODIMENTS

The present invention provides techniques for improved control and communication between controllers and drive units connected by a fibre channel loop. Specific embodiments can provide storage subsystems, methods and apparatus for use in information processing environments, for example. Embodiments can determine when each drive is disconnected from the loop in the external storage subsystem structured by using the FC Loop, and thereupon, the FC Loop can be controlled by bridging the communication path using the PBC so that the loop is not broken.

In one storage subsystem configuration technique, not only in the case of failure, but also in the normal operation, it is possible to control the PBC in order to connect the rarely used drive to the loop only when the drive is actually accessed or to balance the use ratio of each loop, for example. For a more detailed description of one such technique, reference may be had to a Japanese unexamined published patent application Hei 10-285198, for example.

Even if any failure occurs on a drive in the storage subsystem comprising of two or more drives connected each other through the FC Loop, the other drives can continue operating by disconnecting the failed drive from the loop using the PBC. However, an issue that arises is that all drives connected with the loop cannot be used if the loop itself has a failing connection or the communications through the loop are interrupted by any accident.

One technique for addressing this issue is to use the duplicated FC Loops in the storage subsystem comprising of two or more drives connected through the FC Loop. If either of FC Loops has failed, another FC Loop can be used to continue communication.

However, even using the duplicated FC Loops as described above, the location of the failing point in the failing loop cannot be determined. Therefore, another issue arises, in that a service representative has to perform relatively complicated operations to determine the failing point. For example, a technician might have to replace each component unit, such as the drive, connected to the failing loop one by one and test whether the loop works normally at each time of the drive replacement.

Further, other technical issues can arise in FC loop based storage systems. For example, the performance, such as data transfer rate, can deteriorate because only one of the duplicated loops is used for communication. Additionally, even if the duplicated loops system is employed, if a failure occurs in any part of any drive which is common to both loops, it becomes substantially impossible to use both loops for communication, rendering the whole storage subsystem substantially inoperable.

Hereinafter, preferred embodiments of the present invention is explained in detail referring to the drawings.

Figure 1:
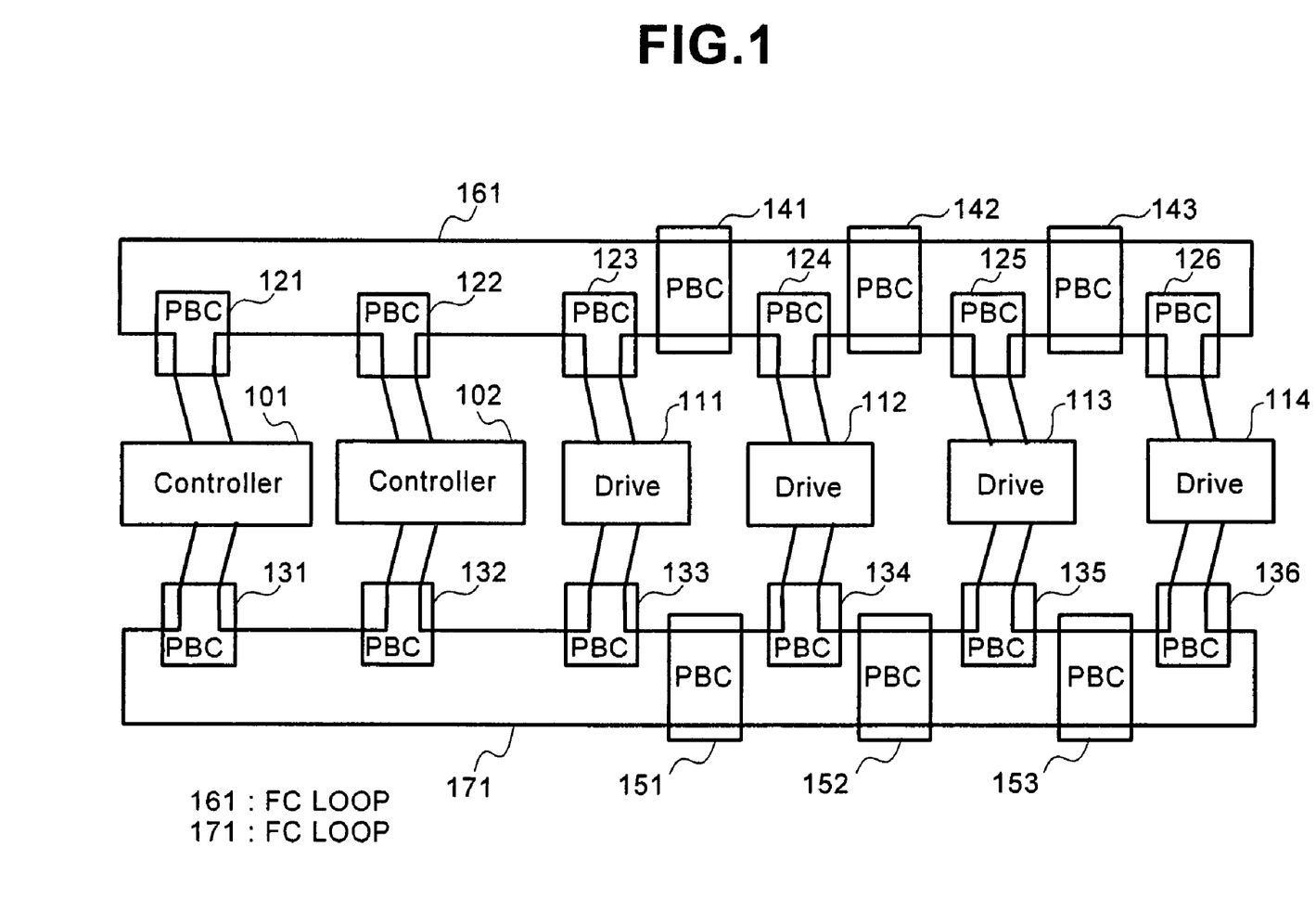
FIG. 1 illustrates a conceptual drawing of an example configuration of a representative FC Loop in a storage subsystem of an information processing system in a particular embodiment of the present invention.
Figure 2:
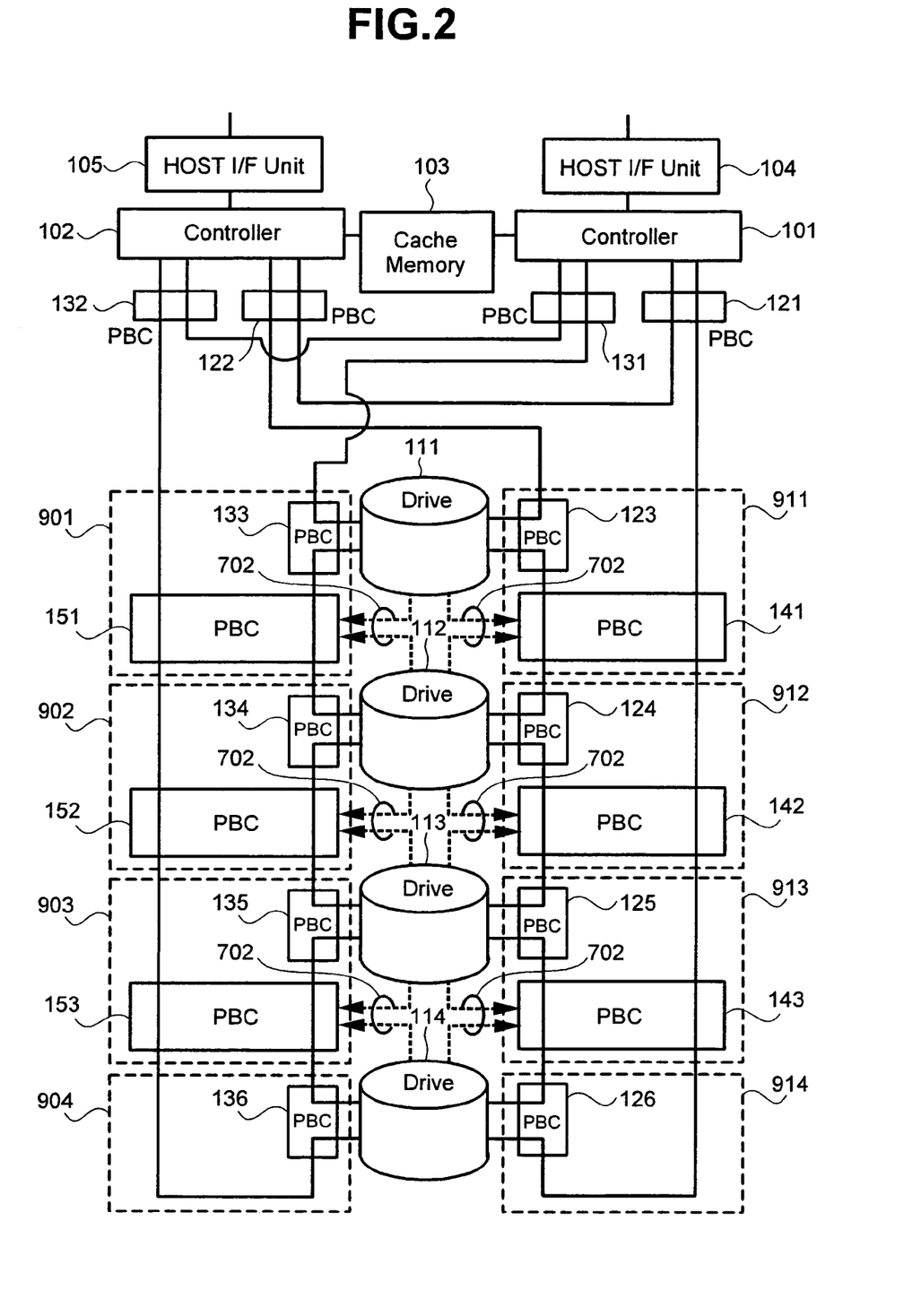
FIG. 2 illustrates a conceptual drawing of an example configuration of the storage subsystem of a preferred embodiment of the present invention.

FIG. 1 illustrates a conceptual diagram showing an example of a loop connecting technique employed in a storage subsystem of an information processing system in a preferred embodiment according to the present invention. FIG. 2 illustrates a conceptual diagram showing an example of a representative configuration of a storage subsystem in a preferred embodiment according to the present invention.

The invention will be explained with reference to example embodiments that use a FIBRE CHANNEL ARBITRATED LOOP (FC_AL) (hereinafter, called FC Loop) for the communication loop in the storage subsystem.

In the example configuration of FIG. 2, the storage subsystem of a specific embodiment is equipped with two or more controllers 101 and 102, a cache memory unit 103 shared by those controllers, and two or more host interface units 104 and 105 to control the data exchange to and from the upper units (not shown in the drawing).

The multiple drives 111, 112, 113, and 114 are connected to the multiple controllers 101 and 102 through the multiple FC Loops 161 and 171, and through the port bypass circuits PBCs so that the multiple drives are shared by the multiple controllers.

As shown in FIG. 2, in the storage subsystem in a specific embodiment, each of two controllers 101 and 102 is connected to both of the FC Loops 161 and 171 through PBC 121 and 122, and PBC 131 and 132, respectively. Each of the four drives 111, 112, 113, and 114 is connected to one of the FC Loops 161 through the PBC 123, PBC 124, PBC 125, and PBC 126 and is also connected to the other FC Loop 171 through the PBC 133, PBC 134, PBC 135, and PBC 136.

In a specific embodiment according to the present invention, PBCs 141 to 143 are connected to the FC Loop 161 to bridge the FC Loop 161, and PBCs 151 to 153 are also connected to the FC Loop 171 to bridge the FC Loop 171.

Blocks 901, 902, 903 and 904, which are marked by dashed lines in FIG. 2, indicate the hardware boards for the first FC Loop. For the second FC Loop, blocks 911, 912, 913 and 914 are installed. These FC Loops were divided into the several hardware boards in order to be able to replace component portions. For example, if an error occurred on board 904, the controller 102 could detect this error by bridging the loop on PBC 153. In this case, this error can be recovered by replacing the board 904.

Note that the board 904 does not include the PBC 153. If the board 904 did include the PBC 153, and an error occurred on the board 904, replacing the board 904 would be difficult because the loop after bridge includes the PBC 153. By these implements, the controller can detect the loop error by using only PCBs 151, 152 and 153.

Figure 3:
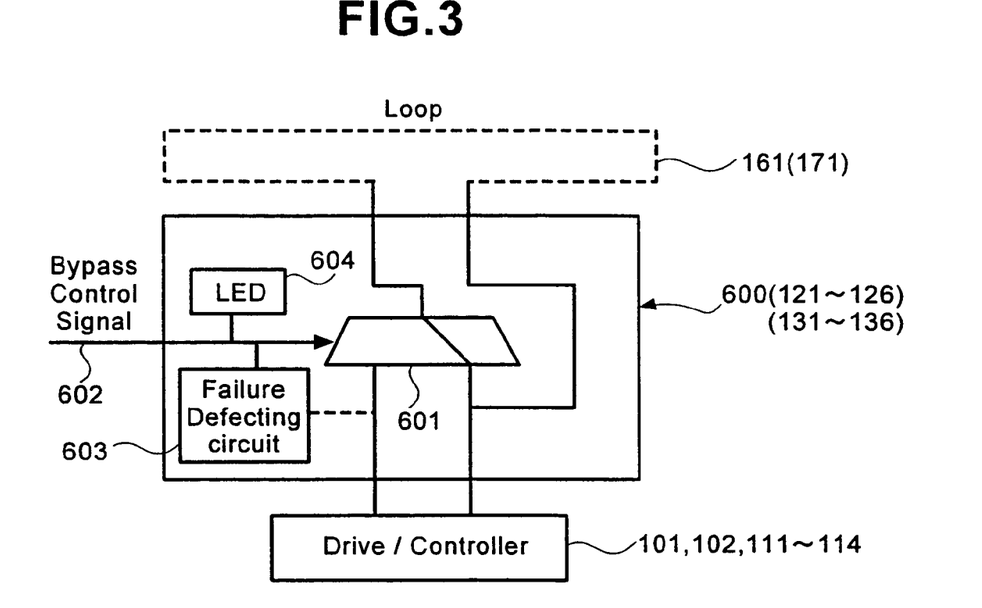
FIG. 3 illustrates a block diagram of an example of a configuration of a port bypass circuit (PBC) that connects equipment and the FC Loop in the storage subsystem of a preferred embodiment of the present invention.
Figure 4:
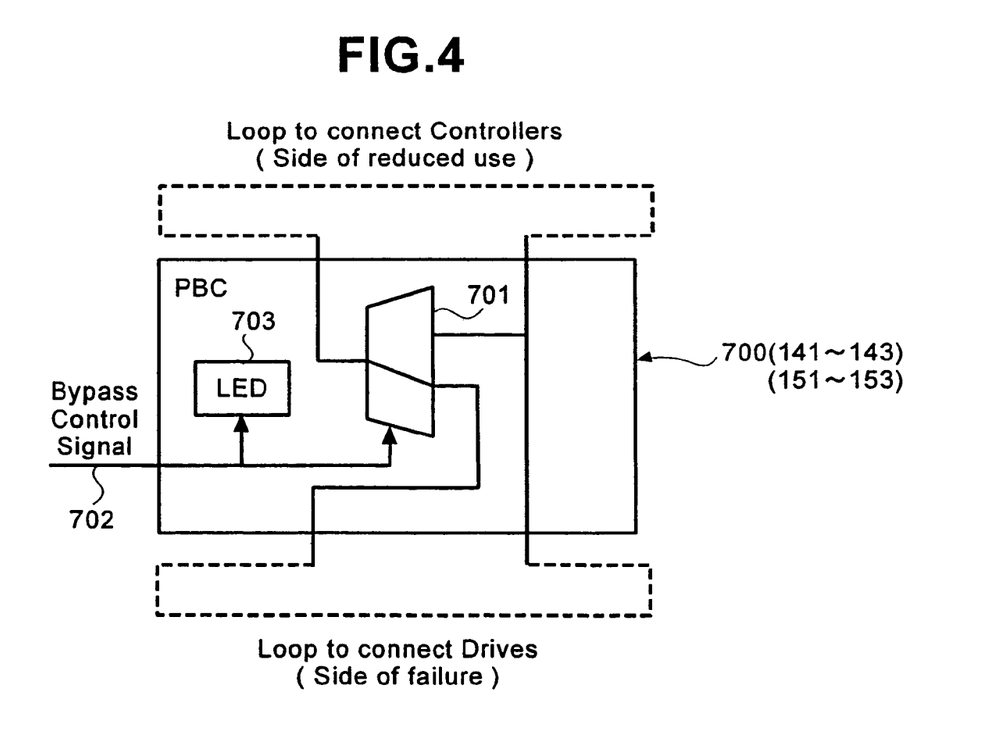
FIG. 4 illustrates a block diagram of an example of a configuration of the port bypass circuit (PBC) that bridges the FC Loop in the storage subsystem of a preferred embodiment of the present invention.

An example of the configuration of the PBC in a specific embodiment according to the present invention is shown in FIG. 3 and FIG. 4. As shown in FIG. 3, each of PBC 121 to PBC 126 and PBC 131 to PBC 136 (hereinafter called PBC 600) which connects each of the controllers or drives to the FC Loop can comprises of a selector 601 to switch the connectivity between the each of drives or controllers and FC Loop 161 or 171, a failure monitoring circuit 603 to monitor the operational state of the drive or the controller and to disconnect the drive or controller from the FC Loop depending upon detected failure on the drive or controller as the result of monitoring, by making use of the bypass controlling signal 602 fed into the selector 601 (in FIG. 3, the selector 601 shows the bypass state), and an indicator lamp 604 such as LED to display that the PBC is in bypass state when the bypass controlling signal 602 is active (bypass state), and so on.

The bypass control signal 602 may be fed from the external unit (for example, a control terminal not illustrated but installed on the drive), so that the bypass condition may be controlled from the external unit independent of the operation of the failure monitoring circuit 603.

The storage subsystem in a specific embodiment employs the SCSI-FCP (SCSI-3 Fibre Channel Protocol) as the Data-Link layer of the fibre channel protocol in the FC Loop 161 and FC Loop 171, for example.

When the SCSI-FCP is employed in the storage subsystem, the controller 101 or 102 as an initiator of the SCSI-FCP can control the ON/OFF state of the bypass controlling signal 602 or 702 to each drive 111 to 114 as the target of the SCSI-FCP by issuing the Send Diagnostic Command. This is one of the FCP command sets having the parameter list specifying the bypass controlling conditions.

Therefore, the controller 101 or 102 can control the bypass operation in each of the PBC 600 or the PBC 700, by outputting the bypass controlling signal 602 or 702, respectively through the control terminal (not illustrated) installed on each of the drives 111 to 114.

Also, in the same way, the controller 101 or 102 can know whether the bypass circuit in the PBC 600 or PBC 700 is active or not (in other words, the status of the bypass controlling signal 602 or 702) by issuing the Receive Diagnostic Result command, in the SCSI FCP command set, through the drives 111 to 114.

As shown in FIG. 4, each of the PBC 141 to 143 or PBC 151 to 153 (called PBC 700 hereinafter) which is installed in the FC Loop 161 or 171 respectively, comprises of a selector 701 to bridge (bypass) the FC Loop 161 or FC Loop 171, a bypass controlling signal 702 which is fed into the PBC from external to control the bridge operation in the selector 701, and an indicator lamp 703 such as LED which is turned on to display that the PBC is in the bypass state when the bypass controlling signal 702 is active (bypass state), and so on.

For example, as shown in the configuration example of FIG. 1 and FIG. 2, the bypass control signal 602, which is fed into each of PBCs 121 to 126, or PBCs 131 to 136, and the bypass control signal 702, which is fed into the PBCs 141 to 143 or PBCs 151 to 153, are issued by the controllers 101 and 102, and can be handed from the nearest drive through the FC Loop on the opposite side to the controlled PBC.

Figure 9:
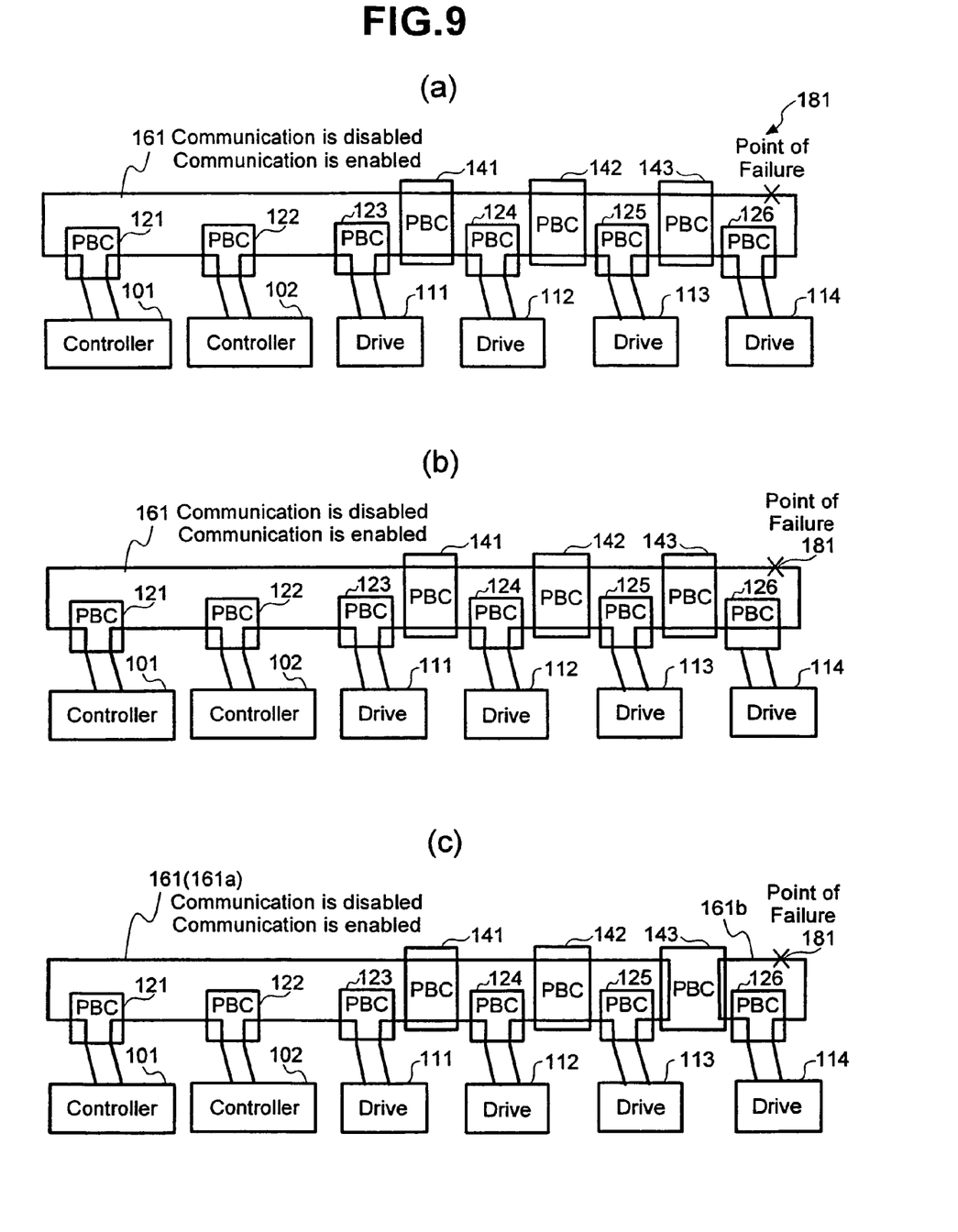
FIGS. 9A to 9C illustrate conceptual drawings of examples of the operation to isolate a part of the FC Loop when a failure has occurred on the FC Loop in the storage subsystem of a preferred embodiment of the present invention.

Therefore, in a storage subsystem of a specific embodiment according to the present invention, if the FC Loop 161 (or 171) is failing, each of the PBCs can be switched as shown in FIG. 9, as will be explained herein below, by making the target drive output the bypass controlling signal 602 or 702 to the near PBC, through another FC Loop 171 (or 161).

Figure 6:
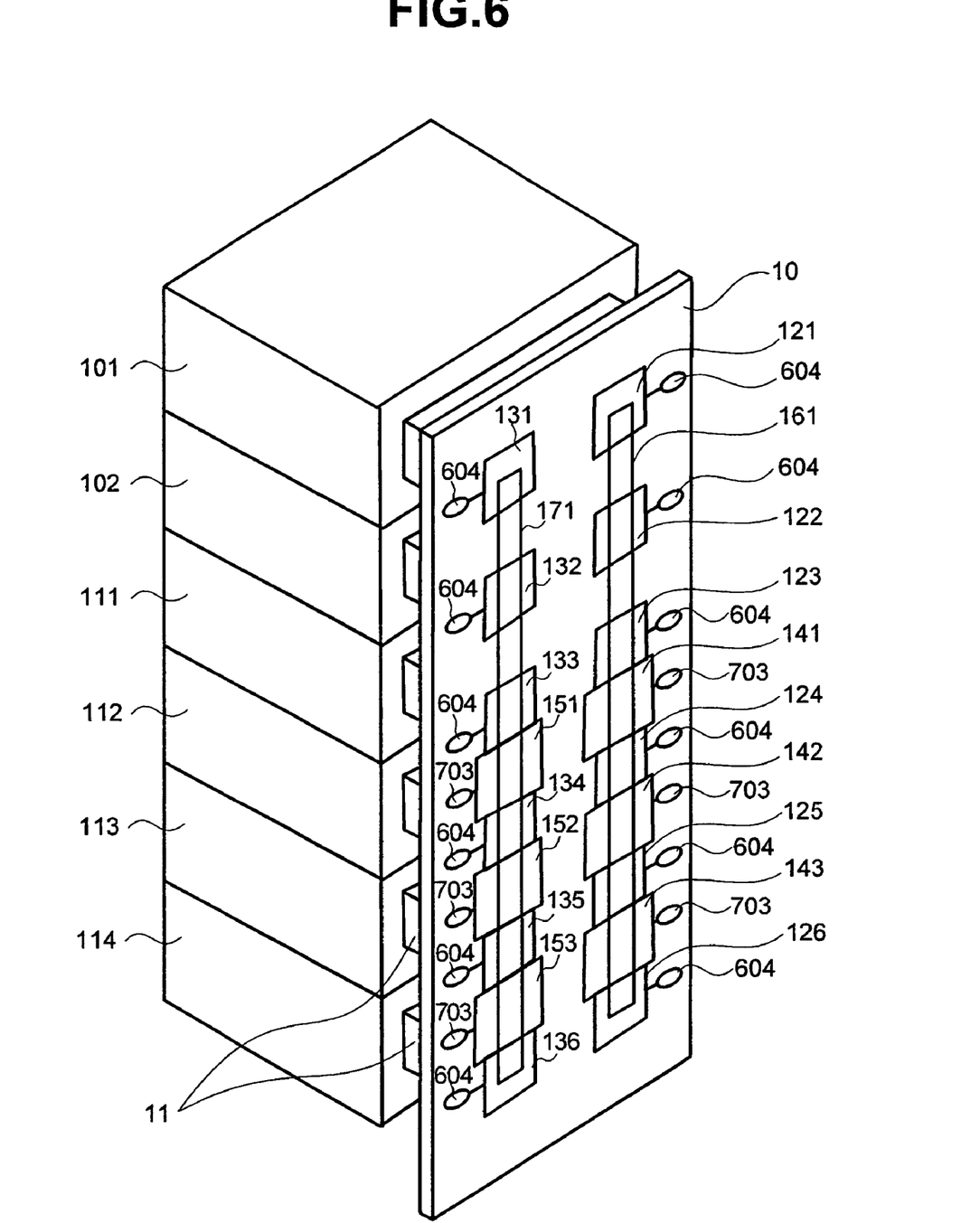
FIG. 6 illustrates a perspective view that illustrates the installation of the storage subsystem of a preferred embodiment of the present invention.

The FC Loops 161 and 171 in the storage subsystem in a specific embodiment of the present invention, comprise not only the communication medium, such as the optical fibre or the metal conductor, but also the printed wiring patterns on the platter board as shown in FIG. 6 may be employed.

As shown in FIG. 6, the storage subsystem in a specific embodiment of the present invention arranges FC Loop 161 and FC Loop 171 as the printed wiring pattern on the platter board 10. Moreover, the PBCs 121 to 126, PBCs 131 to 136 and PBCs 141 to 143, PBCs 151 to 153 are connected with these FC Loops on the platter board 10. Then, through a connector 11, the unit of two or more controllers 101 and 102 and the unit of two or more drives 111 to 114 are free to be connected to, and to be disconnected from, each of two or more FC Loops 161 and 171. In the case of the representative embodiment shown in FIG. 6, the indicator lamp for each PBC may be arranged on the platter board 10, for example, to make the bypass state of each PBC visible externally.

In addition, not specifically shown by a drawing, the storage subsystem of a specific embodiment of the present invention may be connected with an external information system by connecting external communication medium such as optical fibre or metal conductor instead of some drives to the FC Loops 161 and 171 with a connector 11.

A typical example of the storage subsystem as shown in FIG. 6 is a Disk Array Subsystem which is expected to have enhanced reliability of the stored data by not only writing or reading the data from, or to, an upper-level host system. Further, such systems include dispersively writing the redundant data generated from the data to two or more drives 111 to 114, and also to have enhanced data transfer throughput by writing or reading the data to or from two or more drives 111 to 114 simultaneously.

Under the normal operation, each controller can occupy its own dedicated communication band of the multiple FC Loops 161 and 171 by the controller 101 using only the FC Loop 161 exclusively, and by the controller 102 using only the FC Loop 171 exclusively. Also, the communication between either of the controller 101 or 102 and drives 111 to 114 is not influenced from the operations of the other controller.

As described in further detail by a patent unexamined publication 10-285198 JAPAN, when a drive is to be disconnected because the drive is failing or because the drive is not used and had better be removed to improve performance, the storage subsystem of the present invention disconnects the specified drive by using either of the PBCs 123 to 126 or PBCs 133 to 136.

For example, to disconnect the drive 114 from each of the FC Loops in the storage subsystem of a specific embodiment of the present invention, the drive 114 is disconnected from the FC Loop 161 by switching the PBC 126 and is disconnected from the FC Loop 171 by switching the PBC 136.

Figure 7:
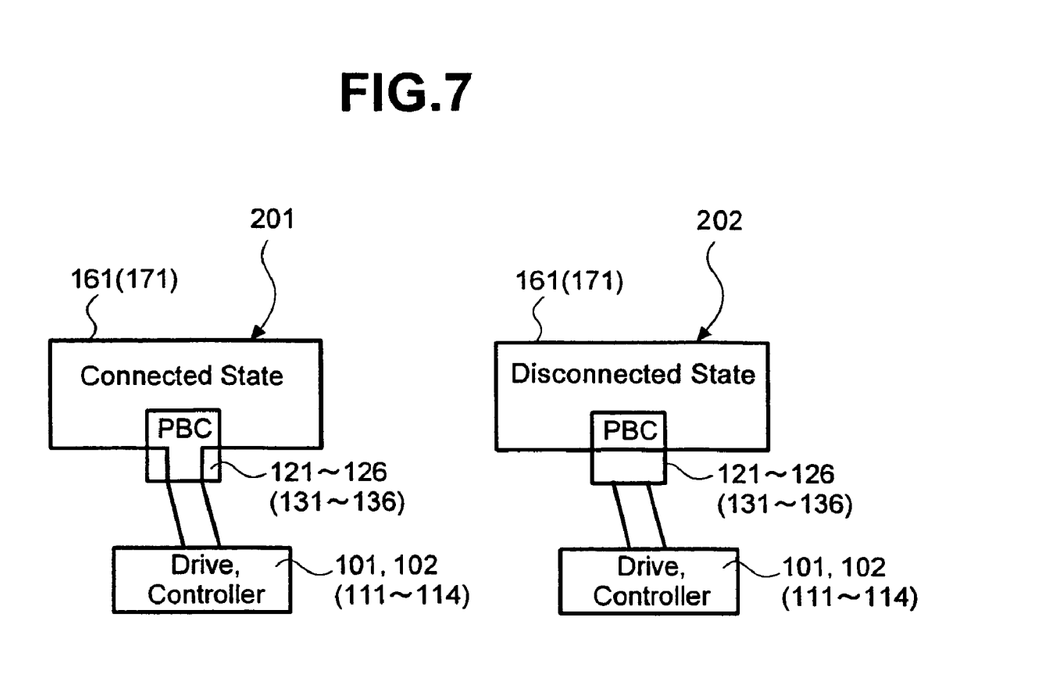
FIG. 7 illustrates a conceptual drawing of an example of an operation to isolate a controller or a drive from the FC Loop in the storage subsystem of a preferred embodiment of the present invention.

The condition of the PBC in this case is shown in FIG. 7. In the storage subsystem of a specific embodiment of this invention, when the drive, or controller, is connected to the FC Loop, the condition of the PBC is the connected state 201 shown in the left side of FIG. 7. On the other hand, to disconnect the drive or controller from the FC Loop, the condition of the PBC is switched to the disconnected state 202 (bypass condition) shown in the right side of FIG. 7, and the drive or controller is disconnected from the FC Loop.

However, if neither drive nor controller fails, but rather, either FC Loop 161 or 171 itself is failing, such failures cannot be recovered by the above mentioned method. If the FC Loop 161 is failing, the controller 101 which has been using the FC Loop 161 is forced to use the FC Loop 171 which is used by the controller 102, to recover from the failure. In this case, since both controllers 101 and 102 use the same FC Loop 171, the band width for the communication which may be allocated to each controller is reduced to half of normal case when both FC Loops 161 and 171 are available and data transfer performance is decreased.

Therefore, in a specific embodiment of the present invention, when the FC Loop is failing, the failing part in the FC Loop is disabled to prevent the decrease in the data transfer performance by controlling the PBCs 141 to 143 or the PBCs 151 to 153. A specific example is explained below.

FIG. 9A illustrates a situation in which one FC Loop 161 of the loops has become unable to communicate due to a loop failure at a point 181 (for simplicity, only the FC Loop 161 is shown). When the FC Loop has failed, at first, the controller 101 or 102 disconnects the drive 114 which is located at the farthest from the controllers from the FC Loop by switching the PBC 126. This condition is shown in FIG. 9B. However, even in the condition of FIG. 9B, because the loop failure is in the point 181 on the FC Loop 161, the FC Loop 161 is still unable to communicate.

Figure 8:
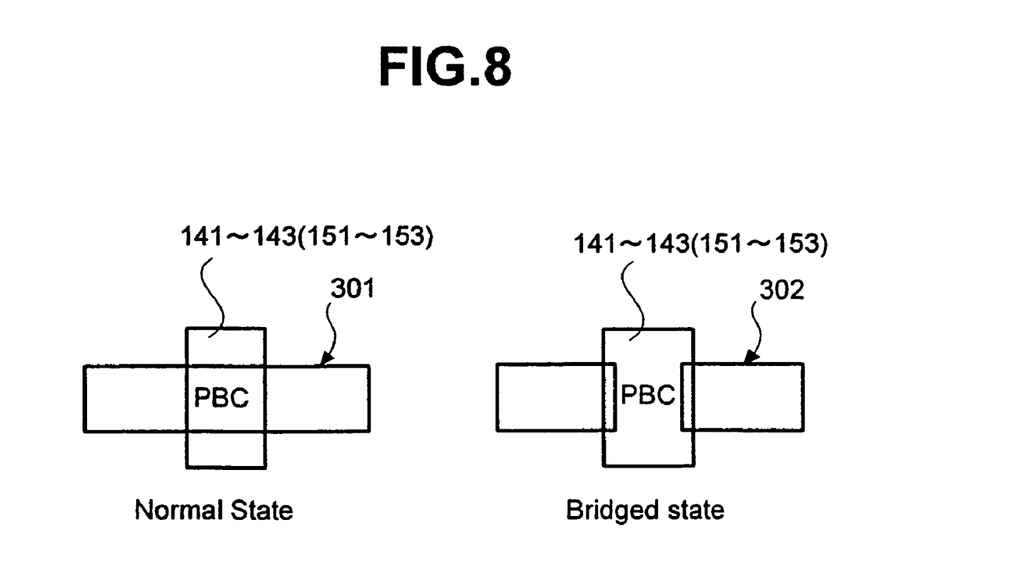
FIG. 8 illustrates a conceptual drawing of an example of an operation to isolate a part of the FC Loop in the storage subsystem of a preferred embodiment of the present invention.

Next, the controller 101 or 102 bridges the FC Loop by switching the PBC 143. The condition of the PBC 143 in this case is shown in FIG. 8. The normal condition of the PBC 143 is the connected state 301 shown by the left side of FIG. 8. However, when the FC Loop is bridged, the condition of the PBC 143 is changed to the bridged state 302 (bypass condition) shown by the right side of FIG. 8, and the FC Loop is divided into two parts, the nearer part (FC Loop 161a) and the farther part (FC Loop 161b). The condition when the PBC 143 is in a bridged state is shown in FIG. 9C. Because the FC Loop 161b, which contains the loop failing part 181, has been removed from the FC Loop 161 as shown in FIG. 9C, the remaining FC Loop 161a can be used for communication. As a result, it is possible to determine that the failure on the FC Loop occurred at a point 181 on the loop.

In other words, in each PBC in a specific embodiment of the present invention, since the indicator lamp is turned on if the PBC is in the bypass state (bridged condition 302), a failing unit within the FC Loops or drives can be easily checked out in troubleshooting by checking the combination of the on/off state of the indicator lamps. Therefore, the maintenance operation such as the replacement of the failing parts becomes relatively easier than in systems according to the prior art. For example, because the storage subsystem, such as the disk array storage, is equipped with a relatively large number of drives, it is expected that a substantial benefit is provided by the capability to make a relatively quick decision regarding the identity of a failing part.

In the condition of FIG. 9C, since the drive 114, which belongs to the FC Loop 161b containing the loop failing part 181, cannot be communicated through the FC Loop 161, the drive 114 has to be communicated through the other FC Loop 171. Because the drives 111, 112 and 113 may be communicated through the FC Loop 161 (FC Loop 161a), the increase in the communication load on the other FC Loop 171 can be held to a minimum.

When a loop failure occurs at another location within the FC Loop 161, the controller 101 or 102 can locate the failing part by switching the PBC 126, 143, 125, 142, 124, 141 and 123 sequentially beginning at the farthest unit from the controller, for example. Then, the controller isolates the failing part from the FC Loop and continues communication using the remaining available part of the FC Loop, so that the decrease in the performance can be held to a minimum.

Figure 5:
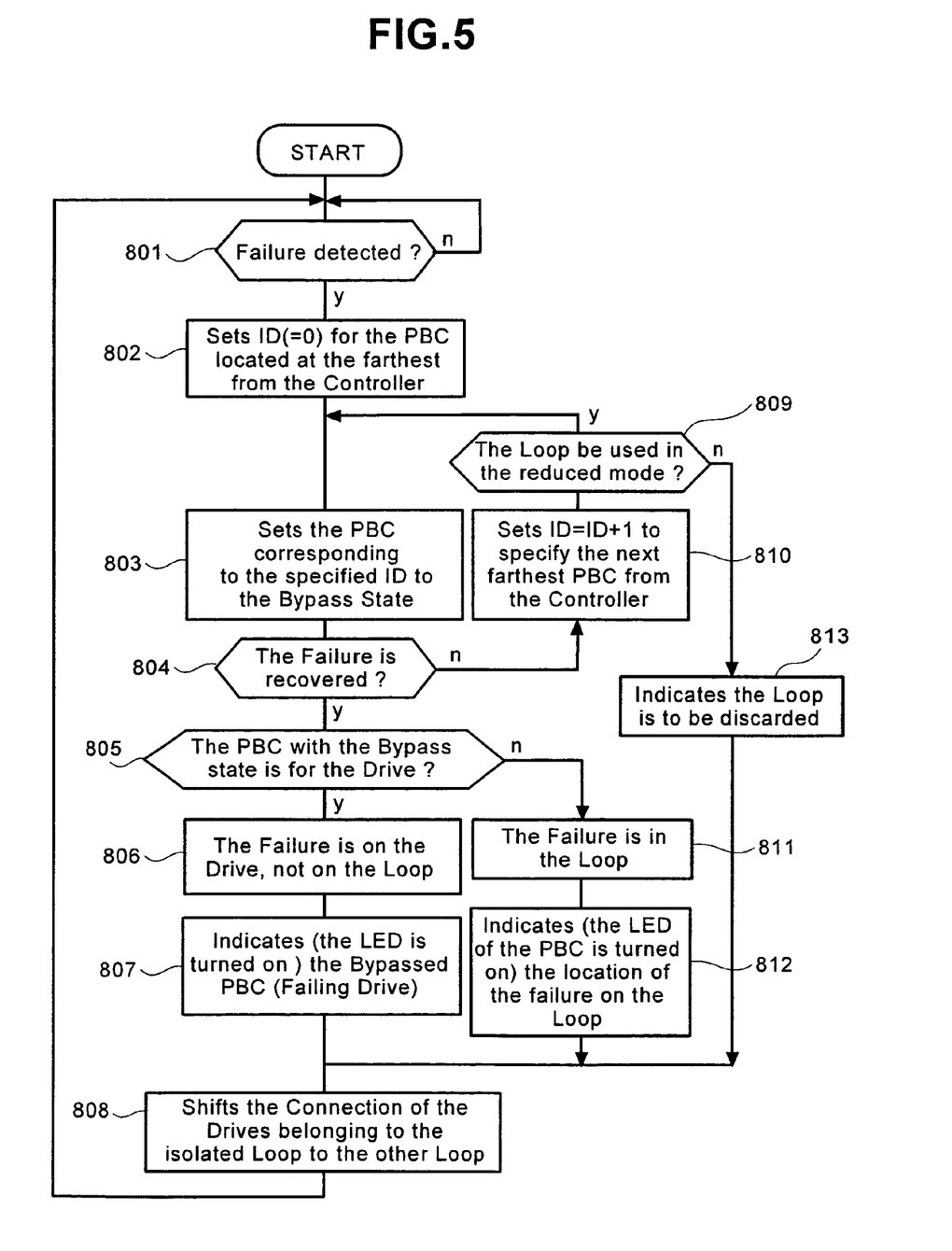
FIG. 5 illustrates a flow chart of an example of an operation to detect a failing unit in the storage subsystem of a preferred embodiment of the present invention.

When the controller automatically performs the operation for locating the failing part as mentioned above, an example of the control operation is shown in a flow chart in FIG. 5. The flow chart of FIG. 5 shows an example in which the controller 101 or 102 automatically performs the bypass/connection operation in each PBC. In the example, each PBC under the control by the controller is identified by the IDs 0, 1, 2, 3,—in ascending order from the farthest unit from the controller and the failure detecting program recognizes the ID and performs the control operation.

Thus, when focusing on the FC Loop 161 (same as for the FC Loop 171 in the following), first, the controllers 101 and 102 assign IDs of 0 to 6 to each of the PBCs 123 to 126 and PBCs 141 to 143, except the controller in ascending order from the farthest PBC from the controllers. Specifically, to PBC 126, an ID="0", to PBC 125, an ID="1", to PBC 124, an ID="2", to PBC 123, an ID="3", to PBC 143, an ID="4", to PBC 142, an ID="5", and to PBC 141, an ID="6" can be assigned in a particular embodiment according to the present invention.

Next, the controllers 101 and 102 monitor (step 801) for the failure occurrence on the loop. If any failure is detected, the controller sets an ID (step 802) corresponding to the farthest PBC (PBC 126 in this case) from the controller and the controller switches the status of the PBC having the ID which is set, to a bypass condition (step 803). This operation is applicable by using the above mentioned FCP command.

Then, the controller 101 or 102 checks (step 804) whether the failure has been recovered from by using the bypass operation described herein above. If the failure has not been recovered from, the controller repeats the similar operation while incrementing the ID (up to 6 in this particular embodiment) until the failure is recovered from (step 810).

When it is impossible to use the partial FC Loop, even when the PBC 141 corresponding to ID=6 is bypassed, then the failure is determined to be non-recoverable (step 809). The controller 101 or 102 judges that the failure is located on a part of the loop nearer to the controller than PBC 141 and makes indication that the FC Loop 161 is to be discarded (step 813).

When the failure is recovered in step 804, the controller 101 or 102 judges whether the PBC corresponding to the ID used for the bypass operation belongs to the PBC 123 to 126 to bypass the drives, or belongs to the PBC 141 to 143 to bypass the FC Loop (step 805). That is, the controller judges whether the failure is caused by the drive or by the FC Loop itself.

Then, if a drive failure is determined (step 806), the controller 101 or 102 turns on the indicator lamp (LED and so on) in the PBC (drive) which was bypassed to indicate that the drive is in the bypass state (step 807) to the outside.

In step 805 again, if it is determined (step 811) that the failure is caused by the FC Loop itself, the controller 101 or 102 turns on the indicator lamp 703 corresponding to the PBC for the loop, to indicate the partial failure of FC Loop (step 812) to the outside. Then, (step 808) the drives which belong to the loop are isolated by the bypass operation to be controlled by the other loop (in this case, FC Loop 171).

As explained herein above, in the information processing system such as the storage subsystem embodied in the present invention in which the controller 101 and 102 and drives 111 to 114 are connected to the multiple FC Loops 161 and 171 through the PBC 121 to 126 and PBC 131 to 136 respectively, each of the FC Loops 161 and 171 is equipped with the PBC 141 to 143 and PBC 151 to 153 respectively to bridge the FC Loop. The controller locates the position of failures by switching control of a bypass operation with each of the PBCs and isolates any detected failing part to re-organize the FC Loop configuration.

Techniques according to the present invention enable specific embodiments to continue maintaining the multiple FC Loops (with reduced mode however) by using the remaining minor but healthy FC Loop (FC Loop 161a) and by switching the only failing part (FC Loop 161b) to the other FC Loop even if the failure occurred in the FC Loop itself. Therefore, the decrease in the reliability or performance can be prevented to the minimum level.

Additionally, in a storage subsystem in a specific embodiment of the present invention, since each controller can perform the switching control for PBC in order from the farthest PBC from the controller, the location of a failing part is detected automatically not only in the case of drive failure but also in the failure in the FC Loop itself. Therefore, the maintenance operation such as recovery procedure can be performed relatively quickly and precisely compared to conventional techniques.

The foregoing technique uses FC Loops 161 and 171 and controls the PBC switching from the remaining working loop when a loop failure occurs. In order to recover from failures that occur in both of the FC Loops substantially simultaneously, a yet further technique can be used.

In an alternative embodiment according to the present invention, an example recovery means for communication failure of the FC Loops when substantially simultaneous failures occur in 2 sets of FC Loops will be explained next.

In a storage subsystem having duplicated FC Loops, such as that illustrated by FIG. 1, any single failure which occurs in either side of the FC Loops can be recovered by switching the failing FC Loop to the other working FC Loop according to the foregoing techniques. However, as the controllers and the drives are connected with both FC Loops, a failure in the controllers or the drives may bring a failure in both of the FC Loops.

In the storage subsystem as shown in FIG. 1, if either of the FC Loops is working for communication, the communication failure can be recovered by controlling the PBC belonging to the failing FC Loop through the working FC Loop. However, if neither FC Loops can be used for the communication, it is not possible to control the PBC using such techniques, so that the communication failure cannot be recovered.

To solve this technical problem, in a storage subsystem in an alternative embodiment according to the present invention, the PBC is not controlled by the communication through the FC Loop. Rather, each controller is connected with each PBC though the other signal line and the PBC is controlled by communication through the signal line. The configuration of a storage subsystem in a representative embodiment is shown in FIG. 10.

Figure 10:
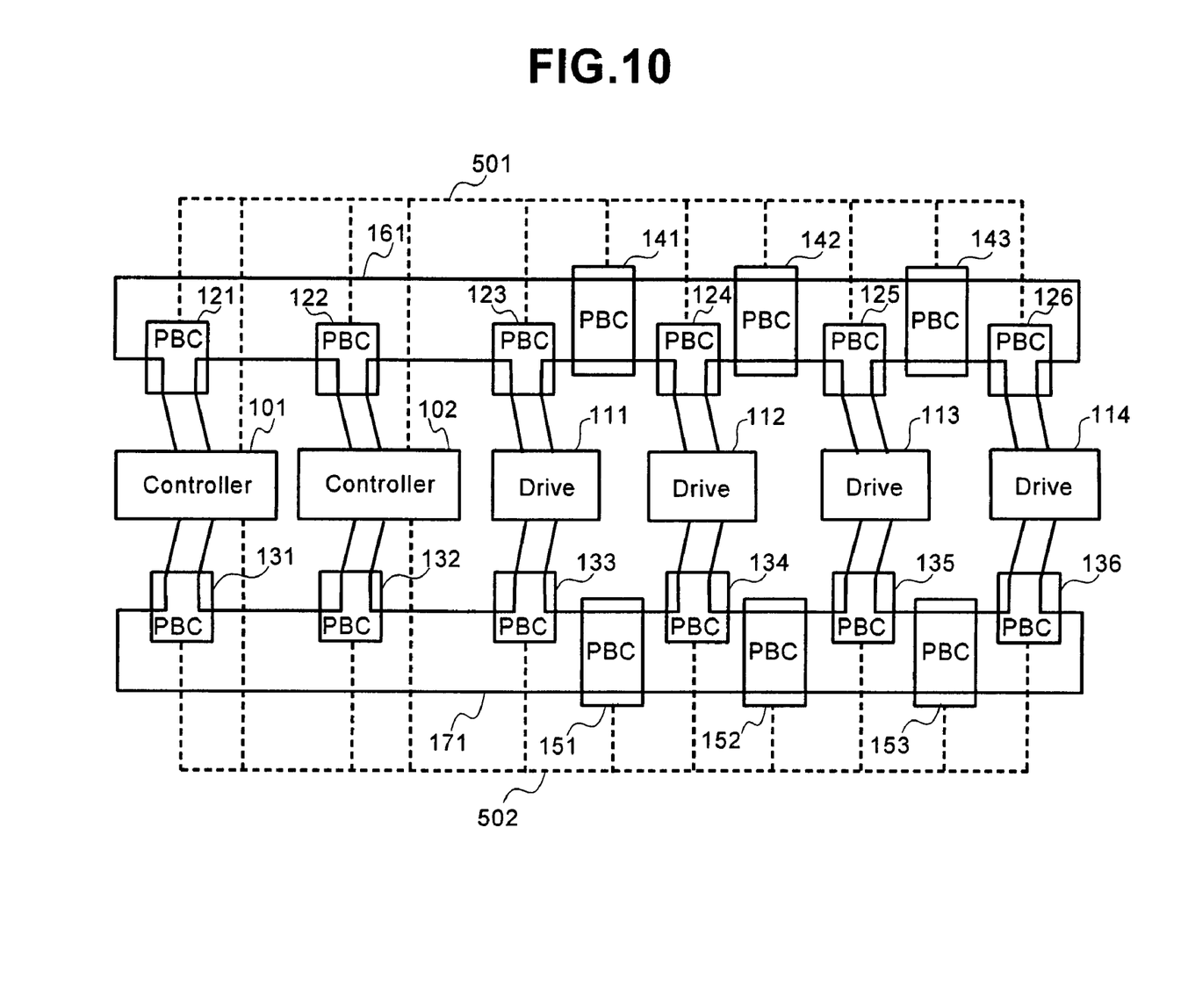
FIG. 10 illustrates a conceptual drawing of another example of the method to control the port bypass circuit (PBC) in the storage subsystem of a preferred embodiment of the present invention.

In the configuration of the storage subsystem of the particular embodiment shown in FIG. 10, the control lines 501 and 502 connecting each controller with each PBC are added to the configuration in FIG. 1 described above. A procedure for recovering from the failure when the failure occurred on both FC Loops substantially simultaneously is shown below. For example, a failure in drive 113 could render both FC Loops unable to communicate.

In the storage subsystem of the embodiment shown in FIG. 10, a failure on the FC Loop 161 is recovered by a technique in which each controller 101 or 102 searches for a PBC which brings the recovery of the communication by switching each PBC starting at the farthest PBC from the controller through the control line 501.

In a specific embodiment, each controller 101 or 102 performs the switching operation sequentially starting at the farthest PBC from the controller on the FC Loop through the control lines 501; from the PBC 126 to the PBCs 143, 125, 142, 124, 141 and 123. In the case of a failure in the drive 113 as mentioned above, the communications on the FC Loop 161 can be recovered by switching the PBC 125.

The recovery of FC Loop 171 is also performed in the same way that each controller 101 or 102 switches each PBC starting at the farthest PBC from the controller through the control line 502 and searches for the PBC that brings the recovery of the communication.

In a specific embodiment, each controller 101 or 102 performs the switching operation sequentially starting at the farthest PBC from the controller on the FC Loop through the control lines 502; from the PBC 136 to the PBCs 153, 135, 152, 134, 151 and 133. In the case of a failure in the drive 113 as mentioned above, the communications on the FC Loop 171 can be recovered by switching the PBC 135.

As described by the foregoing, since the storage subsystem illustrated by FIG. 10 is equipped with control lines 501 and 502, in addition to the multiple FC Loops, and the controller controls multiple PBCs through the control lines in order to isolate the controllers, drives and the FC Loops by bypassing a multiple of the PBCs, any failing unit can be isolated and the failure can be recovered, even if the whole communicating means on the FC Loops becomes unable to continue communication.

The invention has been described with reference to representative example specific embodiments; however, it is to be understood that the invention is not intended to be limited to a specific embodiment and various modifications are readily apparent to those of ordinary skill in the art without departing from the scope of the claimed invention.

For example, in the foregoing explanations, the storage subsystem has been explained as an example of an information processing system; however, the present invention can be widely applied to the general information processing field, which has the communicating means with loop topologies, and so on.

Furthermore, the manner of indicating a failing unit can be achieved in a number of ways in addition to using indicator lamps. For example, the system configuration as shown in FIG. 1 may be displayed on the monitor of a control terminal which controls the controller externally and the failing unit may be displayed visually on the monitor.

The storage subsystem having a communication loop in particular embodiments according to the present invention can keep decreases in the performance and/or reliability to a minimum, even when a failure occurs on the subsystem.

The storage subsystem having a communication loop in particular embodiments according to the present invention, can perform locating of a failing unit. Further, recovery action for the failure can be relatively quickly, simply and precisely performed.

The storage subsystem having multiple communication loops in particular embodiments according to the present invention, the recovery action for the multiple failures that influence two or more communication loops can be precisely performed.

The information processing system having a communication loop in particular embodiments according to the present invention, can hold the decrease in the performance and/or the reliability to a minimum, when a failure occurs on the system.

The information processing system having a communication loop in particular embodiments according to the present invention, can perform locating of a failing unit. Further, recovery action for the failure can be relatively quickly, simply and precisely performed.

The information processing system having multiple communication loops in particular embodiments according to the present invention, the recovery action for the multiple failures that influence two or more communicating means can be precisely performed.

The preceding has been a description of the preferred embodiment of the invention. It will be appreciated that deviations and modifications can be made without departing from the scope of the invention, which is defined by the appended claims.

What is claimed is:

1. A storage system, comprising:
   a plurality of storage drives to store data;
   a plurality of communication loops to connect the plurality of storage drives and to communicate data between the plurality of storage drives;
   a plurality of controllers to connect the plurality of communication loops and to transfer data to a storage drive included in the plurality of storage drives via a communication loop included in the plurality of communication loops;
   a plurality of first bypass switches to connect the plurality of storage drives and the plurality of controllers to the plurality of communication loops in a normal state, and to disconnect one or more storage drives included in the plurality of storage drives or one or more controllers included in the plurality of controllers from the plurality of communication loops in a bypass state; and
   a second bypass switch for each communication loop to disconnect a part of the communication loop included in the plurality of communication loops from another part of the communication loop, and to reconnect the part of the communication loop to the another part of the communication loop,
   wherein a controller included in the plurality of controllers is configured to control the plurality of first bypass switches and the second bypass switch to connect or disconnect, if the controller detects a failure, and to search where the failure is in a communication loop included in the plurality of communication loops or in one or more storage drives included in the plurality of storage drives, by controlling the plurality of first bypass switches and the second bypass switch to connect or disconnect; and wherein the controller is configured to determine whether the failure is caused by a failure of a storage drive or a failure of a communication loop, based on the normal state or bypass state of the plurality of first bypass switches.

2. The storage system of claim 1, wherein the controller, upon detecting a failure, assigns an ID value to the plurality of first bypass switches, the ID value being set to zero for a first bypass switch disposed farthest from the controller in a communication loop and increasing in value incrementally by 1 for each of the first bypass switches disposed closer to the controller in the communication loop; and wherein a specified ID is initially set to zero.

3. The storage system of claim 2 wherein the controller is configured to control the first bypass switch in the communication loop having an ID value corresponding to the specified ID to disconnect in a bypass state.

4. The storage system of claim 3 wherein the controller is configured to determine whether the failure has recovered as a result of controlling the first bypass switch in the communication loop having an ID value corresponding to the specified ID to disconnect in the bypass state.

5. The storage system of claim 4, wherein, if the failure has not recovered, the controller is configured to (1) increment the specified ID by 1 to specify the next farthest first bypass switch in the normal state in the communication loop; (2) control the first bypass switch in the communication loop having an ID value corresponding to the specified ID to disconnect in a bypass state; and (3) determine whether the failure has recovered as a result of controlling the first bypass switch having an ID value corresponding to the specified ID to disconnect in the bypass state; and wherein the controller is configured to repeat steps (1) to (3) until the failure has recovered or, if the failure does not recover, to discard the communication loop.

6. The storage system of claim 5 wherein, if the failure has recovered, the controller is configured to determine whether the failure is caused by a failure of a storage drive or a failure of a communication loop based on the normal state or bypass state of the plurality of first bypass switches.

7. The storage system of claim 6 wherein, if the failure is caused by a failure of a storage drive, the controller is configured to turn on an indicator light in the first bypass switch which is in the bypass state.

8. The storage system of claim 6 wherein, if the failure is caused by a failure of the communication loop, the controller is configured to turn on an indicator light corresponding to the second bypass switch of the communication loop.

9. The storage system of claim 1 wherein, upon detecting a failure in a communication loop of the plurality of communication loops, the controller is configured to control the second bypass switch to connect or disconnect in order to bridge the communication loop at a location to isolate a failure location of the communication loop.

10. A method for searching for a failure of a storage system comprising a plurality of storage drives to store data; a plurality of communication loops to connect the plurality of storage drives and to communicate data between the plurality of storage drives; a plurality of controllers to connect the plurality of communication loops and to transfer data to a storage drive included in the plurality of storage drives via a communication loop included in the plurality of communication loops; a plurality of first bypass switches to connect the plurality of storage drives and the plurality of controllers to the plurality of communication loops in a normal state, and to disconnect one or more storage drives included in the plurality of storage drives or one or more controllers included in the plurality of controllers from the plurality of communication loops in a bypass state; and a second bypass switch for each communication loop to disconnect a part of the communication loop included in the plurality of communication loops from another part of the communication loop, and to reconnect the part of the communication loop to the another part of the communication loop, the method comprising:

controlling the plurality of first bypass switches and the second bypass switch to connect or disconnect, if the controller detects a failure, searching where the failure is in a communication loop included in the plurality of communication loops or in one or more storage drives included in the plurality of storage drives, by controlling the plurality of first bypass switches and the second bypass switch to connect or disconnect; and determining whether the failure is caused by a failure of a storage drive or a failure of a communication loop, based on the normal state or bypass state of the plurality of first bypass switches.

11. The method of claim 10 further comprising:

assigning, upon detecting a failure, an ID value to the plurality of first bypass switches, the ID value being set to zero for a first bypass switch disposed farthest from the controller in a communication loop and increasing in value incrementally by 1 for each of the first bypass switches disposed closer to the controller in the communication loop; and setting initially to zero a specified ID.

12. The method of claim 11 further comprising controlling the first bypass switch in the communication loop having an ID value corresponding to the specified ID to disconnect in a bypass state.

13. The method of claim 12 further comprising determining whether the failure has recovered as a result of controlling the first bypass switch in the communication loop having an ID value corresponding to the specified ID to disconnect in the bypass state.

14. The method of claim 13 further comprising:

if the failure has not recovered, (1) incrementing the specified ID by 1 to specify the next farthest first bypass switch in the normal state in the communication loop; (2) controlling the first bypass switch in the communication loop having an ID value corresponding to the specified ID to disconnect in a bypass state; and (3) determining whether the failure has recovered as a result of controlling the first bypass switch having an ID value corresponding to the specified ID to disconnect in the bypass state; and repeating steps (1) to (3) until the failure has recovered or, if the failure does not recover, discarding the communication loop.

15. The method of claim 14 further comprising, if the failure has recovered, determining whether the failure is caused by a failure of a storage drive or a failure of a communication loop based on the normal state or bypass state of the plurality of first bypass switches.

16. The method of claim 15 further comprising, if the failure is caused by a failure of a storage drive, turning on an indicator light in the first bypass switch which is in the bypass state.

17. The method of claim 15 further comprising, if the failure is caused by a failure of the communication loop, turning on an indicator light corresponding to the second bypass switch of the communication loop.

18. The method of claim 10 further comprising, upon detecting a failure in a communication loop of the plurality of communication loops, controlling the second bypass switch to connect or disconnect in order to bridge the communication loop at a location to isolate a failure location of the communication loop.

* * * * *